United States Patent Office 2,909,316
Patented Oct. 20, 1959

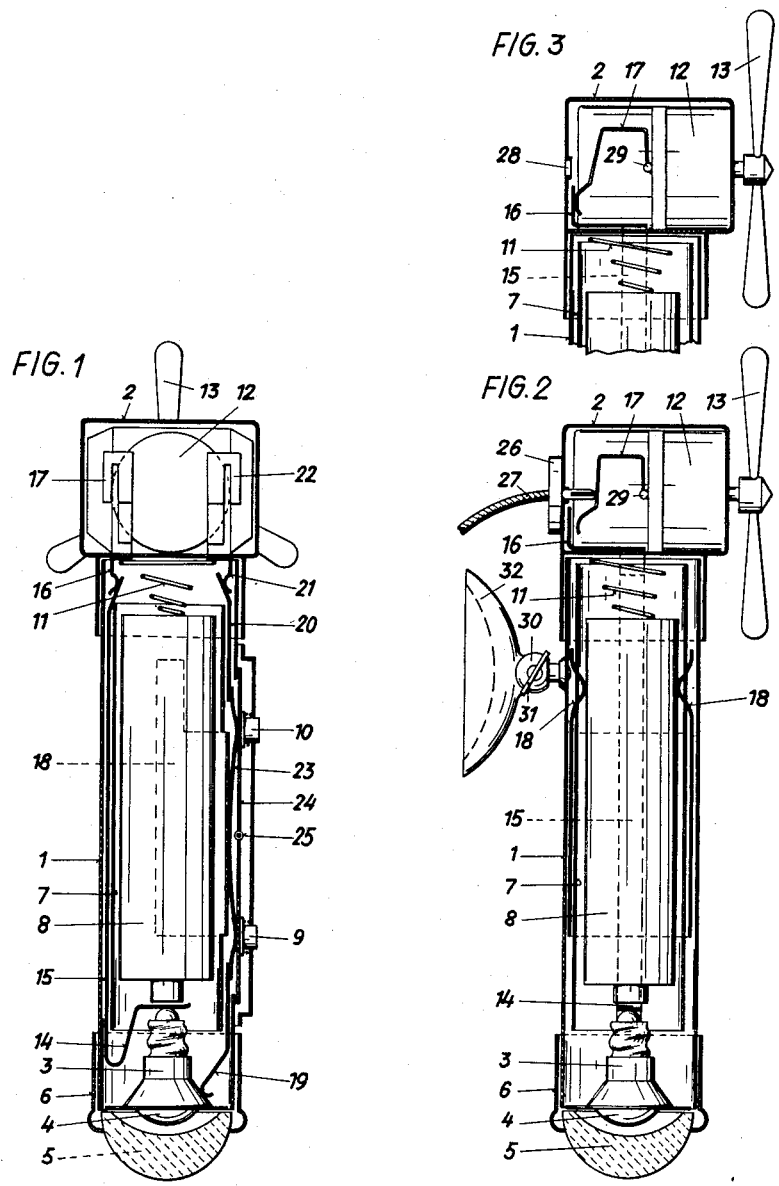

2,909,316

PORTABLE FANS

Caroline (Karla) Prohaczka and Stefan Prohaczka, Vienna, Austria

Application March 20, 1957, Serial No. 647,398

Claims priority, application Austria March 22, 1956

1 Claim. (Cl. 230—249.5)

Portable or pocket fans have already been disclosed, in which the housing of a torch battery carries a housing for a motor, which drives the fan. It has also been proposed pivotally to arrange a motor and fan blades in the middle of a flat housing and to accommodate the batteries feeding the motor on one side thereof and a light bulb with a separate battery on the other side.

The invention relates to a portable fan, which has a housing provided with a light bulb, disposed at one end of the preferably tubular battery housing and the motor disposed at the other end thereof, the bulb and motor being fed by the same power source.

The housing is preferably provided with two switches, e.g. push-button contacts, which block each other and serve to switch on the fan and the light bulb, respectively.

The invention provides further that the housing of insulating material comprises contact strips serving as current conductors, which are embedded in the housing or connected thereto in another suitable manner.

A conductor surrounding the battery and connected to the switch spring of the push-button contact may be provided for conducting current from the housing pole of the battery.

The drawing shows diagrammatically and by way of example an embodiment of the invention.

Fig. 1 is a central sectional view taken parallel to the plane of the fan blades.

Fig. 2 is a sectional view taken at right angles to Fig. 1, with an inserted plug from an external source of power.

Fig. 3 is a view similar to Fig. 2 and showing the upper part of the portable fan with the plug removed.

The motor housing 2 with the motor 12, which drives the fan 13, can be pushed on the cylindrical lamp housing 1, which consists of insulating material, e.g. of molded plastics. The light bulb 4 is screwed into the socket 3 affixed to the housing 1 and is disposed in the usual manner behind a lens 5, which is carried by a sleeve 6 fitted on the housing.

The battery 8, which bears on the housing 1 through the intermediary of the spring 11, is disposed in an insulating sleeve 7. The positive lead 14, 15 extends from the carbon pole of the battery between the housing 1 and the sleeve 7. When the motor housing 2 has been mounted on the housing 1 the lead 14, 15 contacts the conductor 16, which is contacted by the contact spring 17 of the motor 12 when the plug 26 has been pulled out (Fig. 3).

The circuit of the light bulb 4 can be closed by actuating the push-button contact 9 to connect the housing 1 to the negative lead 19 extending to the socket 3 for the light bulb. The circuit of the motor 12 can be closed by actuating the push-button contact 10, from which the negative lead 20 extends to the conductor 21; that connection is closed when the motor housing 2 has been pushed on the housing 1 because the contact spring 22 contacts the lead 21 when the plug 26 has been pulled.

The switch spring 23 of the two contacts 9 and 10 engages the negative lead 18, which contacts the cylindrical shell of the battery 8, whose paper wrapper must be removed. The rocker 24 is pivoted at 25 and permits only one of the push buttons 9 and 10 to be pressed at a time.

When the plug 26 connected to the power cable 27 leading from an external source of power is plugged into the socket 28 it will force the contact springs 17 and 22 inwardly so that the same are disengaged from the leads 16 and 21. The contact springs 17 and 22 are connected to the brush contacts 29 of the motor 12 and form a double-throw switch together with the leads 16 and 21 and the plug 26.

A vacuum cup 32 of rubber is attached to the side wall of the housing by means of a ball-and-socket joint 30 and a set screw 31. This permits mounting of the electrical appliance with the aid of that vacuum cup to the windshield of a motor vehicle in order to produce fresh air in the car by circulating the air. If the device is arranged in that way the motor 12 may be fed from the battery of the vehicle rather than from the battery of the device. To this end the motor can be connected to an electric cable, the other end of which is plugged into a plug socket mounted on the dashboard and connected to the car battery.

While the present specification describes a preferred example of the invention, it is intended to cover all changes, modifications, and combinations which do not depart from the spirit and scope of the invention as claimed.

We claim:

A portable electric light and fan appliance comprising in combination an elongated housing, electric light means including a light bulb socket mounted at one end of said housing, electric fan means including an electric motor mounted on the opposite end of said housing, a power source, conductor means extending axially off said housing, and operably connecting one terminal of said power source with one terminal of said fan means and with one terminal of said light means, additional conductor means extending axially of said housing and operably connecting the second terminal of said power source with the second terminals of said fan and light means, selector switch means interposed in between said last-named conductor means for selectively closing and breaking their respective electric circuits, wherein said power source includes a battery mounted within said housing and a separate outside power source, said housing including an inlet socket for said outside power source having an associated conductor interposed in one of said conductor means operatively connected with said fan means and means to interrupt said conductor of said fan means associated with said inlet socket in response to application of said outside power source.

References Cited in the file of this patent

UNITED STATES PATENTS

| | | |
|---|---|---|
| 1,108,053 | Wiwi et al. | Aug. 18, 1914 |
| 1,466,350 | Barany | Aug. 28, 1923 |
| 1,473,045 | Puttaert et al. | Nov. 6, 1923 |
| 1,504,003 | Trumbull | Aug. 5, 1924 |
| 1,645,487 | Harling | Oct. 11, 1927 |
| 1,671,744 | Rosenberg | May 29, 1928 |
| 1,737,237 | Helling | Nov. 26, 1929 |
| 1,772,439 | Garbs | Aug. 5, 1930 |
| 2,595,406 | Popovich | May 6, 1952 |